United States Patent [19]

Wedding

[11] Patent Number: 5,283,679
[45] Date of Patent: Feb. 1, 1994

[54] COMMUNICATIONS PROCESS, TRANSMITTER AND RECEIVER FOR ANALOG SIGNALS

[75] Inventor: Berthold Wedding, Korntal-Münchingen, Fed. Rep. of Germany

[73] Assignee: Alcatel N.V., Amsterdam, Netherlands

[21] Appl. No.: 804,398

[22] Filed: Dec. 10, 1991

[30] Foreign Application Priority Data

Dec. 15, 1990 [DE] Fed. Rep. of Germany ....... 4040170

[51] Int. Cl.$^5$ .......................................... H04B 10/00
[52] U.S. Cl. .................................. 359/154; 359/124; 359/181; 359/189
[58] Field of Search .............. 359/154, 124, 180–181, 359/184–186, 189, 173; 455/59, 61, 103; 375/38, 41; 370/20; 372/38

[56] References Cited

U.S. PATENT DOCUMENTS

| | | | |
|---|---|---|---|
| 3,222,459 | 12/1965 | Drapkin | 455/103 |
| 4,497,068 | 1/1985 | Fischer | 359/186 |
| 4,789,987 | 12/1988 | Fraser | 372/31 |
| 5,016,242 | 5/1991 | Tang | 359/124 |

FOREIGN PATENT DOCUMENTS

3744537 7/1989 Fed. Rep. of Germany.
2179517 3/1987 United Kingdom.

*Primary Examiner*—Herbert Goldstein
*Assistant Examiner*—K. Negash
*Attorney, Agent, or Firm*—Spencer, Frank & Schneider

[57] ABSTRACT

In a transmitter including a carrier source an input signal is present which contains the information to be transmitted and is composed of signal components having amplitudes less than a predetermined threshold value or equal to the threshold value and signal components whose amplitudes are less than the threshold value or equal to the threshold value. For the purpose of identification, the two signal components are sampled in different ways, for example at different frequencies and are combined into a modulation signal in such a manner that the two signal components have the same sign. In a receiver, a circuit arrangement is provided which identifies the sign of the partial signals on the basis of their different sampling frequencies, demodulates envelope curves and combines them into an output signal which corresponds to the signal.

The transmitter and receiver are advantageously components of an analog optical transmission system. They prevent the clipping effect while simultaneously increasing the degree of modulation.

17 Claims, 6 Drawing Sheets

COMMUNICATIONS PROCESS, TRANSMITTER AND RECEIVER FOR ANALOG SIGNALS

BACKGROUND OF THE INVENTION

The invention relates to a communications process, to a transmitting device and to a receiving device.

In connection with transmitting devices it is desirable to optimize the minimum value of the transmitting amplitude, for example, on the basis of amplitude dependent distortions and the service life of the carrier source. This may mean that, with fixed transmission parameters, a minimum maximum value for the transmitting amplitude of the transmitted communications signal is desirable and care must be taken that the lowest possible minimum value of the signal amplitude does not fall below a threshold value that is specific for the carrier source.

U.S. Pat. No. 4,789,987 discloses an optical transmitter which automatically regulates the minimum value of the signal amplitude of the communications signal by way of a carrier source specific threshold value and at the same time keeps the maximum amplitude of the communications signal at a minimum. In the prior art signal source, which is a laser diode, a so-called clipping effect occurs if the threshold value is not reached and leads to a distortion in the communications signal.

If one now considers the probability distribution curve of the signal amplitudes which serve to modulate the carrier sources, one notes that one of the two ends of this distribution curve ends below the threshold value which leads to distortion in the communications signal. In order to reduce the probability of the amplitude falling below the threshold value, the prior art circuit increases the direct current component of the injection current. The result is that the maximum value as well as the mean value of the probability distribution curve of the transmission amplitudes increases.

SUMMARY OF THE INVENTION

It is an object of the invention to provide a way in which the maximum value as well as the mean value of the probability distribution curve of the signal amplitude of a transmitted communications signal can be minimized without creating distortions in the communications signals because a carrier source specific threshold value is not reached.

This is accomplished by providing a transmitter for transmitting particular communications signals. The transmitter converts input signals into communications signals in such a manner that the carrier source of the communications signal can be operated at a minimum operating point which permits low distortion transmission.

The particular communications signal used is characterized in that it is composed of a first signal component ($g_1$) and a second signal component ($g_2$), both containing the information to be transmitted (and possibly a constant component t). The first and second signal components ($g_1$, $g_2$) are sampled differently. An input signal (a) is also composed of two signal components containing the information to be transmitted, that is, a first signal component ($a_1$) having amplitude values greater than or equal to a threshold value ($U_O$) and a second signal component ($a_2$) having an amplitude value that is less than or equal to the threshold value ($U_0$). The first signal components ($a_1$, $g_1$) and the second signal components ($a_2$, $g_2$) of the input signal (a) and of the communications signal (g) each contain the same information. The amplitudes of the two signal components ($g_1$, $g_2$) of the communications signal (minus a possibly existing constant component) are rectified.

A particular advantage of the invention is that the energy density for small amplitude values of the transmitted communications signals is increased.

BRIEF DESCRIPTION OF THE DRAWINGS

Two embodiments of the invention will now be described with reference to seven drawing Figures. It is shown in.

DETAILED DESCRIPTION OF THE PREFERRED EMBODIMENTS

The invention will now be described with reference to the communications signal of a transmitter and receiver for the transmission of analog optical signals. It is pointed out, however, that the invention also covers communications signals as well as transmitters and receivers in which the transmission is effected, for example, by way of radio waves or in some other way. The invention is also suitable for use in connection with the transmission of digital signals, particularly for the transmission of digital signals which also have a negative state such as, for example HDB3 coded signals.

Figure 1:
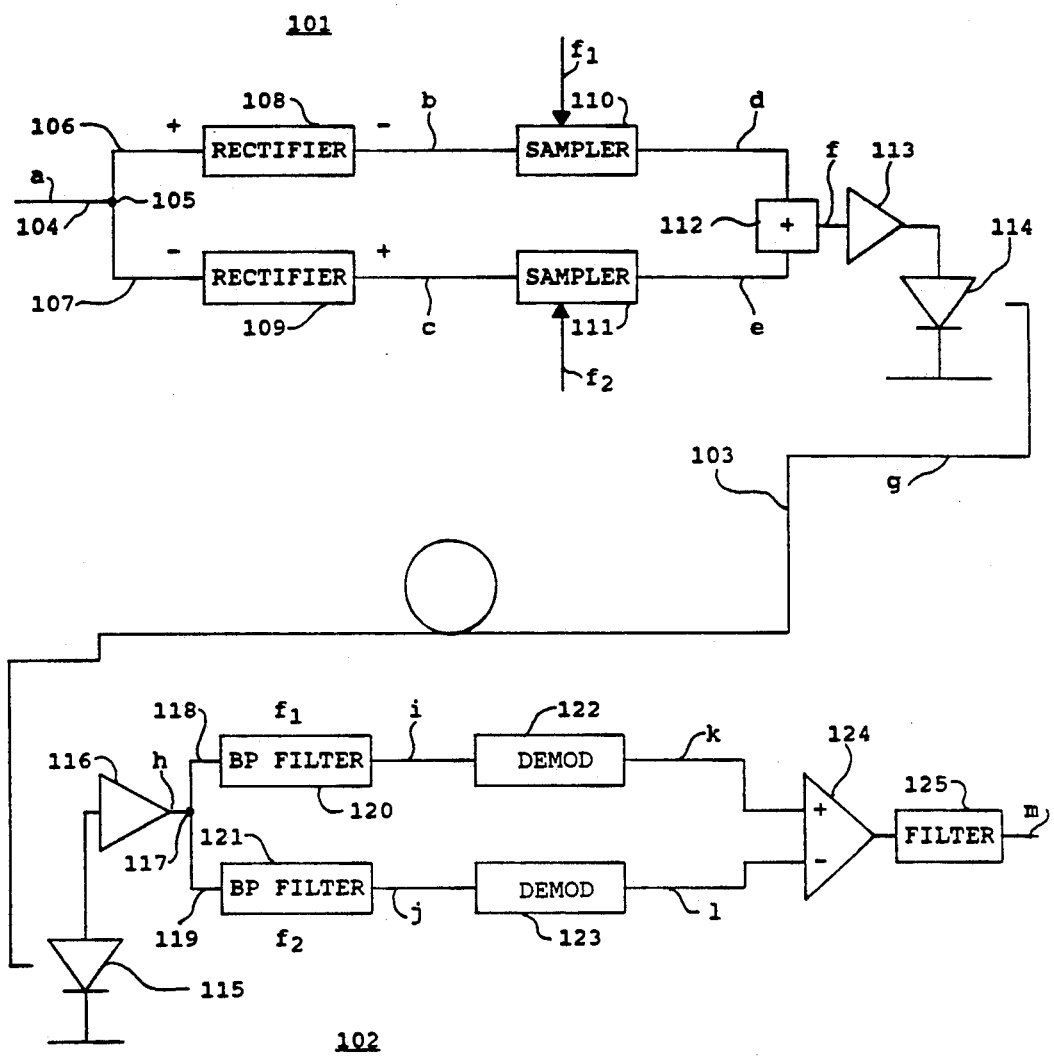
FIG. 1, a block circuit diagram for a first embodiment of a transmitter according to the invention and a receiver according to the invention connected therewith.

FIG. 1 is a block circuit diagram for a first embodiment of a transmitter 101 according to the invention and a receiver 102 according to the invention which are connected with one another by means of a light waveguide 103. It is also possible for transmitter 101 and receiver 102 to be connected with other transmitters and receivers, for example, by way of a switching center or a passive coupler (not shown).

Figure 2A:
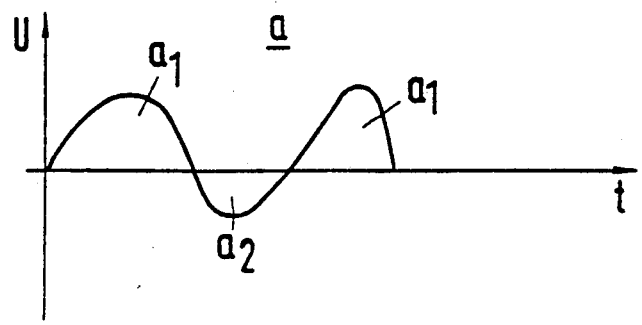
FIGS. 2A to 2M, a communications signal according to the invention as well as further intermediate signals required to generate and evaluate this signal including an input signal and an output signal.
Figure 2B:
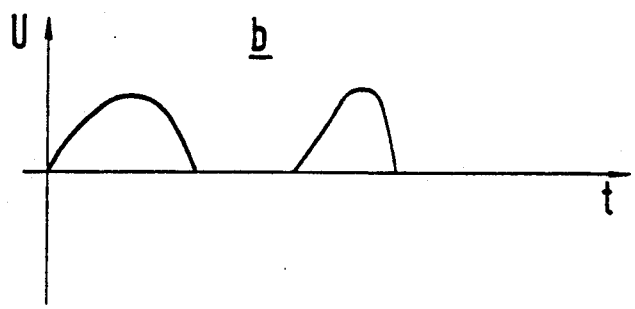
Figure 2C:
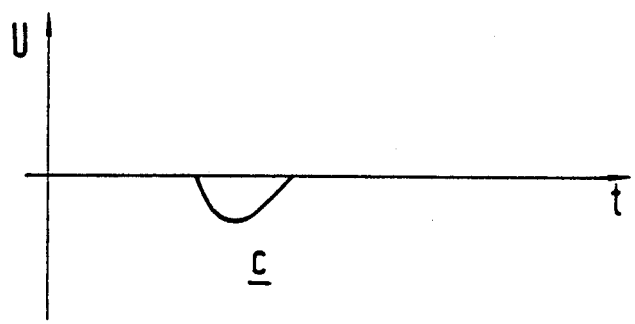
Figure 2D:
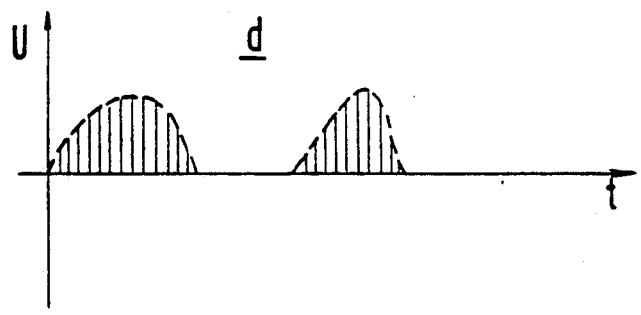
Figure 2E:
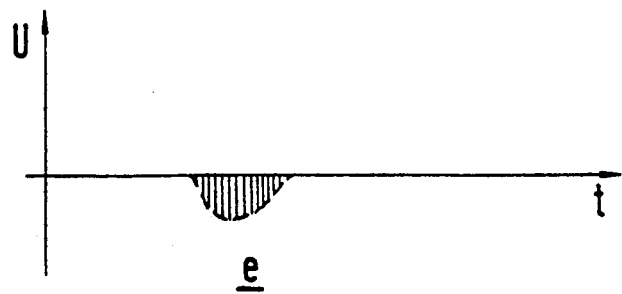
Figure 2F:
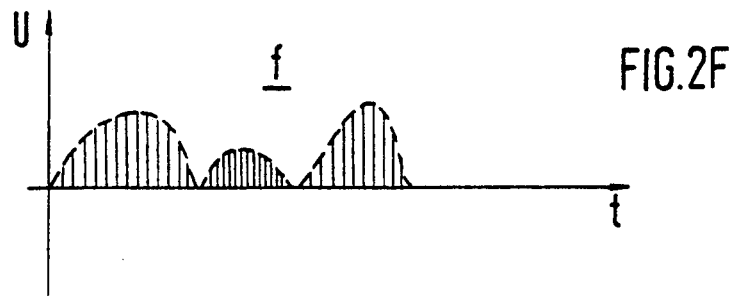
Figure 2G:
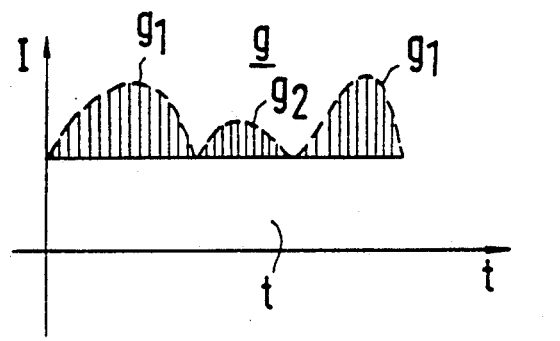
Figure 2H:
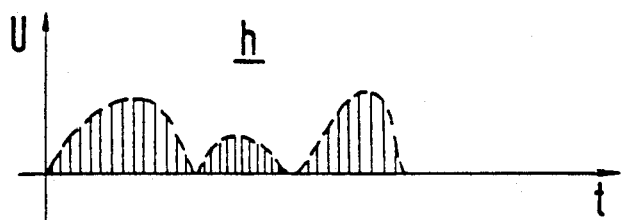
Figure 2I:
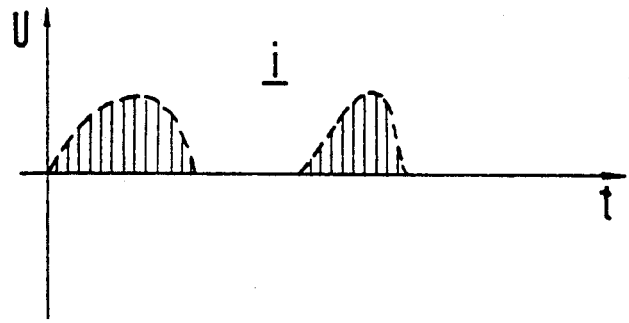
Figure 2J:
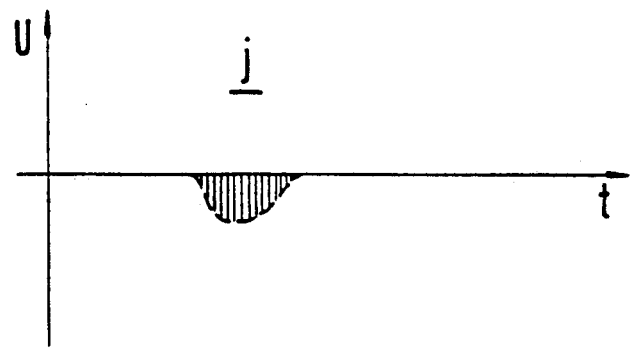
Figure 2K:
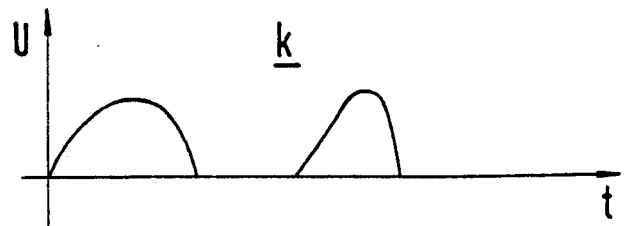
Figure 2L:
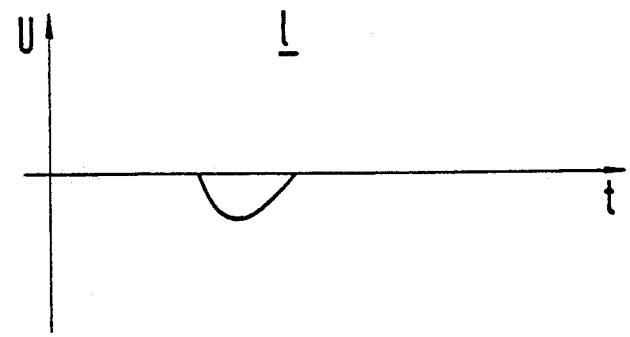
Figure 2M:
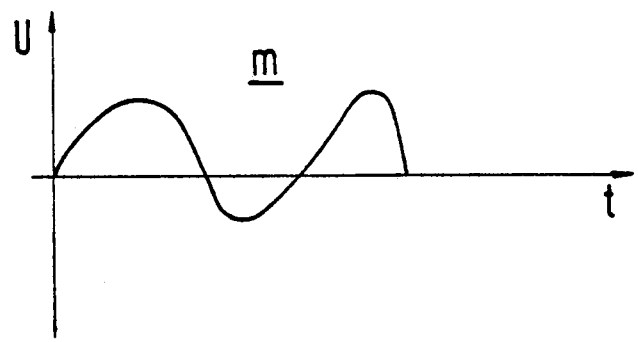

In FIGS. 2A to 2M, several signals are plotted over time. FIG. 2A includes the signal which contains the information to be transmitted, input signal a; FIG. 2G includes the communications signal g and FIG. 2M depicts the signal m containing the information to be transmitted at the output of the receiver. The Figures therebetween show intermediate signals or signal components which the signal to be transmitted goes through in the meantime.

The remainder of the specification relates to the apparatus features of FIG. 1 and the signals from FIGS. 2A to 2M.

In transmitter 101, the input signal a is conducted through a connecting line 104 and a power divider 105, to a first branch 106 and a second branch 107. The two branches 106) and 107 each include a rectifier 108 and 109, respectively, which are oppositely oriented in polarity with respect to power divider 105. Signal components $a_2$ whose amplitudes have negative values are filtered out of signal a in rectifier 108, thus creating a signal b. Signal components $a_1$ whose amplitudes have positive values are filtered out of signal a in rectifier 109, creating a signal c. Then, signal b is pulse amplitude modulated in a sampler 110, that is, it is converted into a sampled signal d. Correspondingly, signal c is converted in a second sampler 111 into a sampled signal e. The first sampler 110 employs a first sampling frequency $f_1$ which differs from the sampling frequency $f_2$ present in the second sampler 111. Downstream of samplers 110 and 111, the two branches 106 and 107) are each connected with an adder 112 in which the two sampled signals d and e are added in the correct phase position to form a modulation signal f in such a manner that only a positive voltage amplitude remains.

The illustrated embodiment is based on a signal a whose voltage amplitude oscillates about a threshold value U=0 Volt. However, it is also possible for this signal to include a direct voltage component which must be suppressed before the partial signals are fed to the rectifiers 108 and 109.

In the part of the transmitter 101 described so far, generally speaking, the negative component of an alternating voltage signal is mirrored into the positive component, with the two components being sampled in a different manner for the purpose of identification.

Modulation signal f is now amplified in a known manner in an amplifier 113 and is fed to a carrier source 114 as the modulation signal. Amplitude modulation is provided as the type of modulation, with phase modulation also being possible, in principle.

A directly modulated laser is provided as carrier source 114. In order for this laser to overcome the threshold value of the injection current $I_{th}$, a direct current component of the injection current $I_J$ is added. Thus, communications signal g includes a carrier t and a signal g containing the information to be transmitted. Signal g is composed of two signal components, a first signal component $g_1$ and a second signal component $g_2$, with the first signal component $g_1$ containing the same information as the first signal component $a_1$ and the second signal component $g_2$ contains the same information as the second signal component $a_2$ of signal a to be transmitted. Communications signal g is fed to receiver 102 by way of a light waveguide 103.

In receiver 102, communications signal g is received in a known manner in a signal sink 115, a photodiode, the carrier is separated in a known manner and the remainder is amplified in an amplifier 116 and fed as received signal h to a power divider 117 that is connected with a first branch 118 and a second branch 119. A bandpass filter 120 and 121, respectively, is disposed in each of the two branches 118, 119 and following them an envelope curve demodulator 122 and 123, respectively, or a synchronous demodulator (not shown), are provided before the two branches are combined again in a subtracter 124. Bandpass filter 120, 121, respectively, in each of the branches 118 and 119 now passes only that part of received signal H which is sampled at the corresponding frequency $f_1$, $f_2$. In the first branch 118, the signal component sampled at frequency $f_1$ is forwarded, thus producing sampled signal component i, and in the second branch 119 the signal component sampled at frequency $f_2$ is forwarded, thus creating signal component j. Signal component i is fed to an envelope curve demodulator 122 and a signal component k having a positive amplitude is generated. Signal component j is fed to an envelope curve demodulator 123 in which a signal component l is created which has a negative amplitude. Signal components k and l are combined in a subtracter 124 and are fed to a lowpass filter 125 at whose output an output signal m is present which corresponds to received signal a. It is also possible to invert a signal component in a branch and to combine the signal components from the two branches 118 and 119 in an adder.

Stated generally, the two sampled signal components e and d are identified in receiver 102 E on the basis of the different sampling, are provided with their original signs and combined again.

Figure 3:
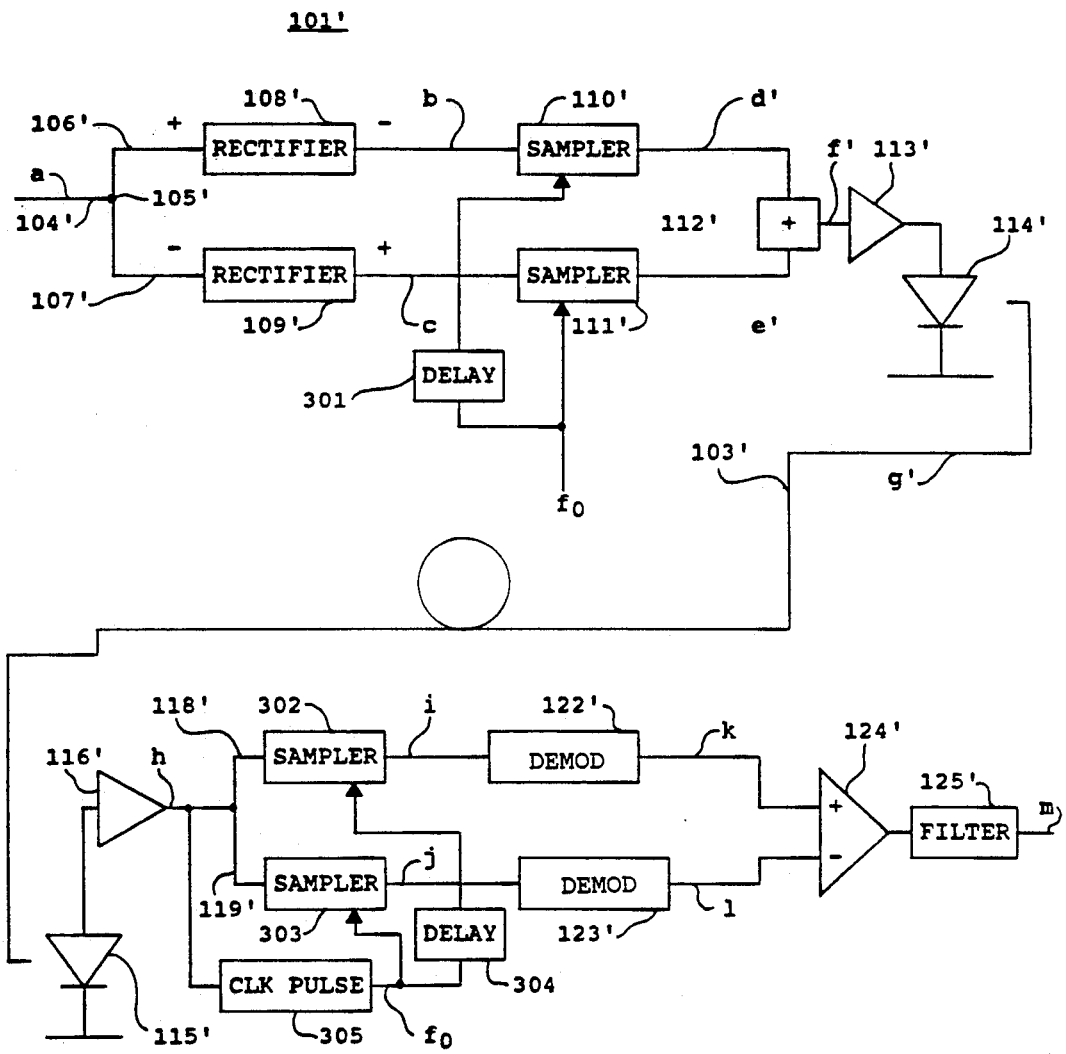
FIG. 3, a block circuit diagram of a second embodiment of a transmitter according to the invention and a receiver according to the invention connected therewith.

FIG. 3 is a block circuit diagram for a second embodiment of a transmitter 101' according to the invention and a receiver 102' according to the invention. The second embodiment substantially coincides with the first embodiment; therefore, only the differences will be described.

The difference between transmitter 101' compared to transmitter 101 from the first embodiment is that transmitter 101' includes two samplers 110' and 111' which are both sampled at the same sampling frequency $f_0$, with the phase of the actuating pulses fed to sampler 110' being delayed in phase relative to the phase of the actuating pulses fed to sampler 111' by a delay time T in a delay member 301. Signals d', e', f', g' and h' are thus pulse amplitude modulated signals which are all sampled at the same sampling frequency $f_0$.

In contrast to receiver 102 of the first embodiment, in receiver 102' bandpass filters 120 and 121 are replaced by samplers 302, 303 and a phase delay member 304. The two samplers 302 and 303 are actuated at the same sampling frequency $f_0$ as the two samplers 110' and 111'. The actuating pulses for sampler 302 are here delayed in phase relative to the actuating pulses for sampler 303 by means of a phase delay member 304 which has the same delay time T as in transmitter 101'. The clock pulse frequency $f_0$ for the actuating pulses fed to samplers 302 and 303 can be obtained from communications signal g' by means of a method known to the person skilled in the art with the aid of a clock pulse output line 305 or also by means of a local oscillator (not shown). Signals b and c are thus placed by means of samplers 110', 111' into two different time slots which are accessed separately by samplers 302, 303. The advantage over the first embodiment is that only a single sampling frequency and thus a lower bandwidth is required for the communications signal according to the invention.

Figure 4:
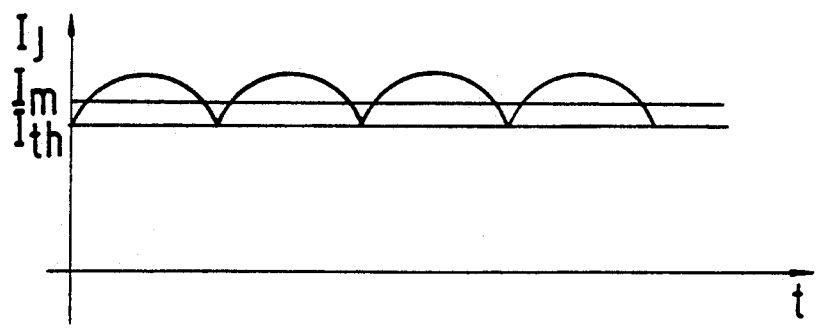
FIG. 4, the laser injection current $I_J$ of a laser included in the transmitter according to the invention plotted over time.
Figure 5:
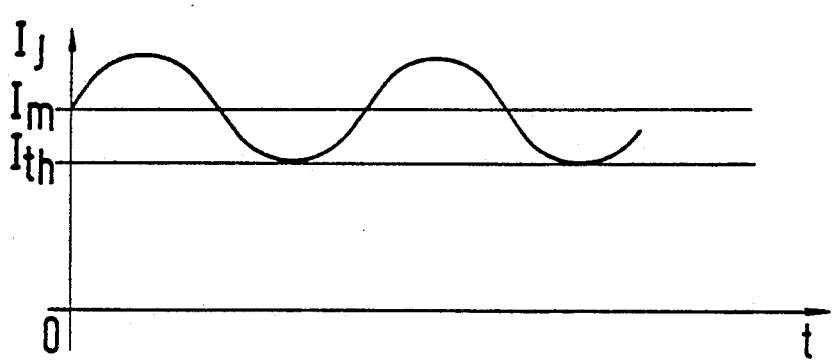
FIG. 5, the laser injection current $I_J$ of a laser included in a prior art transmitter arrangement plotted over time.

In order to illustrate the effect of transmitters 101, 101' according to the invention more graphically, the injection current $I_J$ for a sine signal is plotted over time in FIG. 4 instead of signal a. For a comparison, FIG. 5 is the same illustration for a prior art transmitter, for example, the above-mentioned prior art transmitter. It can be seen that the mean value of the injection current $I_m$ and the maximum amplitude value of injection current $I_J$ are significantly lower in the transmitter according to the invention. This makes it possible, in the transmitter S according to the invention, to realize, for example, a transmission of a greater degree of modulation and/or to utilize further channels.

Figure 6:
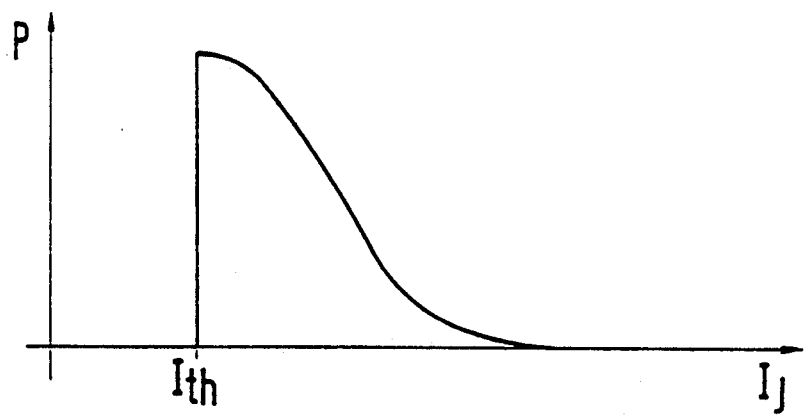
FIG. 6, a probability distribution curve for the occurrence of the amplitude values of the injection current of a laser included in a transmitter according to the invention.
Figure 7:
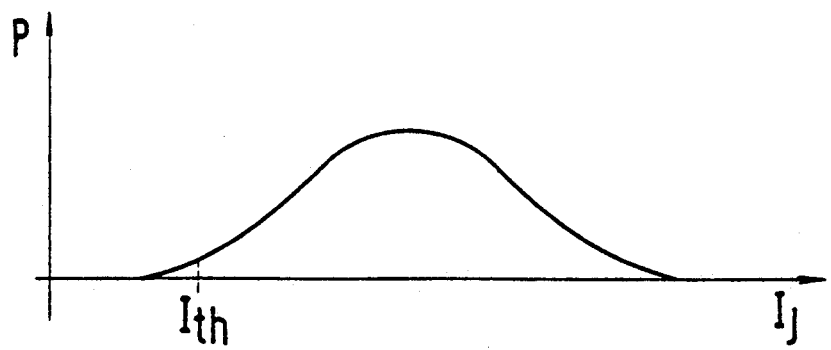
FIG. 7, a probability distribution curve for the occurrence of the amplitude values of the injection current of a laser included in a prior art transmitter.

FIG. 6 shows, plotted over the injection current $I_J$, the relative probability P with which an amplitude of injection current $I_J$ is present at the laser of the transmitter S according to the invention for a fictitious but realistic incoming signal a which is assumed to contain the information to be transmitted. It can be seen that it is not possible for the injection current $I_J$ to fall below the threshold value $I_{th}$ to thus create the clipping effect as a result of any type of signal which contains the information to be transmitted. For comparison, FIG. 7 shows the same for a prior art transmitter, for example, the transmitter of the prior art described above. It can be seen that the left end of the probability distribution curve lies below threshold valued $I_{th}$ which may be caused by fluctuations in the level of the signal containing the information to be transmitted and leads to distortion in the communications signal. Moreover, analogously to the description of FIGS. 3 and 4, it becomes clear that a higher power density can be realized for low amplitudes of injection current $I_J$.

It must also be pointed out that a configuration of the transmitter according to the invention as an optical transmitter with a directly modulated laser as the carrier source TQ is particularly advantageous but the invention is not limited thereto. Instead, a transmitter can also be operated, for example, with an indirectly modulated carrier source, in which case it is necessary for the sampled modulation signal f then not to be fed to the signal source but to the external modulation device.

It will be understood that the above description of the present invention is susceptible to various modifications, changes and adaptations, and the same are intended to be comprehended within the meaning and range of equivalents of the appended claims.

What is claimed is:

1. A communications process for producing a communications signal including a carrier modulated with a signal derived from an input signal, comprising:

producing, from an input signal, a communications signal composed of a first output signal component and a second output signal component, both output signal components containing information to be transmitted, and a constant component;

sampling the first and second output signal components differently;

wherein the input signal is composed of two input signal components containing the information to be transmitted, a first input signal component having amplitude values greater than or equal to a threshold value and a second input signal component having an amplitude value that is less than or equal to the threshold value, and wherein the first input and output signal components and the second input and output signal components of the input signal and the communications signal respectively each contain the same information; and rectifying the amplitudes of the two output signal components of the communications signal minus the constant component.

2. A communications process according to claim 1, wherein, the step of sampling differently, comprises sampling the two output signal components at different sampling frequencies.

3. A communications process according to claim 1, wherein, in the step of sampling, sampling pulses are provided, sampling pulses for the first output signal component being shifted in phase relative to those of the second output signal component.

4. A transmitter for transmitting a communications signal which converts input signals into communications signals so that a carrier source of the communications signal can be operated at a minimum operating point permitting low distortion transmission, comprising:

connecting means, through which an input signal is provided, for dividing the input signal into two branches, the first branch including first thresholding means for forwarding only those signal components whose amplitude is greater than a threshold value or equal to the threshold value, and the second branch including a second thresholding means for forwarding only those signal components whose amplitude is less than the threshold value or equal to the threshold value, each one of the two branches further including sampling means, each sampling means for sampling the respective forwarded signal components, said sampling means sampling the respective forwarded signal components differently;

adding means for combining respective sampled signals from the two branches in a correct relative phase position so that a combined sampled signal is produced at an output of the adding means which is composed of both branches signal components, the amplitudes of both branches signal components being rectified; and modulating means for modulating the combined sampled signal with a carrier signal generated by a carrier signal source.

5. A transmitter according to claim 4, wherein the sampling means samples each of the respective forwarded signal components at a different sampling frequency.

6. A transmitter according to claim 5, wherein the sampling means samples the respective forwarded signal components so that sampling pulses of a first sampled signal component are shifted in phase relative to those of a second sampled signal component in the combined sampled signal.

7. A transmitter according to claim 4, wherein the threshold value is a voltage value of 0 Volts.

8. A transmitter according to claim 4, wherein the modulating means comprises a directly modulated laser diode in which a direct current component of an injection current exceeds a laser threshold current.

9. A receiver for receiving a communications signal which includes transmitted information comprising:

signal sink means for receiving a communications signal;

dividing means for receiving an input signal derived from the received communications signal and dividing the input signal into two branches, each branch including respective different filtering means for forwarding only a respective signal component of the input signal that resulted from a predetermined sampling, each branch further including demodulating means for demodulating respective forwarded signal components; and subtracting means for combining the respective demodulated signal components from the two branches in a relative phase position so that at an output of the subtracting means, an output signal is provided which contains the information transmitted and which has amplitudes for the respective two signal components which take on opposite signs relative to a predetermined threshold value.

10. A receiver according to claim 9, wherein the threshold value is a voltage value of 0 Volts.

11. In a communications system having a transmitter, a transmission medium and a receiver, a transmitter comprising:
   dividing means for dividing an input signal into two identical signals;
   rectifying means, operatively coupled to the dividing means, for receiving the identical signals and outputting two differential signals, a first of the differential signals containing components of the identical signals having negative amplitude values and a second of the differential signals containing components of the identical signals having positive amplitude values;
   sampling means, operatively coupled to the rectifying means, for individually sampling the respective first and second differential signals differently and producing respective first and second sampled signals;
   combining means, operatively coupled to the sampling means, for combining the first and second sampled signals to produce a combined signal;
   amplifying means, operatively coupled to the combining means, for amplifying the combined signal; and
   transducer means, operatively coupled to the amplifying means, for transducing the amplified combined signal to produce a transmission signal for communication to the receiver of the system over the transmission medium.

12. The transmitter according to claim 11, wherein the sampling means includes first and second samplers for sampling the first and second differential signals respectively, the first sampler sampling at a different frequency from the second sampler; and
   wherein the combining means combines the first and second sampled signals to produce a combined signal having only positive amplitudes.

13. The transmitter according to claim 11, wherein the input signal contains a direct voltage component and wherein the transmitter further comprises:
   dc blocking means, operatively coupled to receive the input signal and pass it to the dividing means, for removing the direct voltage component from the input signal.

14. In a communications system having a transmitter, a transmission medium and a receiver, a receiver comprising:
   transducer means for transducing a received transmission signal from the transmitter over the communications medium to produce a received signal;
   amplifying means, operatively coupled to the transducer means, for amplifying the received signal;
   dividing means, operatively coupled to the amplifying means, for dividing the amplified received signal into first and second identical signals;
   first filtering means, operatively coupled to the dividing means, for individually filtering the respective first and second identical signals to produce respective first and second filtered signals;
   demodulating means, operatively coupled to the first filtering means, for individually demodulating the respective first and second filtered signals to produce respective first and second demodulated signals;
   combining means, operatively coupled to the demodulating means, for combining the first and second demodulated signals to produce a combined signal; and
   second filtering means, operatively coupled to the combining means, for filtering the combined signals to produce an information signal.

15. The receiver according to claim 14, wherein the first filtering means comprises first and second band-pass filters for filtering the first and second identical signals respectively, the first band-pass filter being tuned to a different frequency from the second band-pass filter.

16. The transmitter according to claim 11, wherein the transmitter further comprises:
   delay means, operatively coupled to the sampling means, for providing the sampling means with first and second sampling signals, the first sampling signal being delayed with respect to the second sampling signal, whereby the respective first and second differential signals are sampled using the first and second sampling signals respectively.

17. The receiver according to claim 14, wherein the filtering means comprises first and second sampling means for individually sampling the respective first and second identical signals; and wherein the receiver further comprises:
   delay means, operatively coupled to the first and second sampling means, for providing respective first and second sampling signals to the first and second sampling means, the first sampling signal being delayed with respect to the second sampling signal.

* * * * *